United States Patent [19]
Hirose et al.

[11] Patent Number: 5,124,785
[45] Date of Patent: Jun. 23, 1992

[54] COLOR TELEVISION IMAGE PROCESSING APPARATUS AND METHOD HAVING COLOR FADING REDUCTION FUNCTION

[75] Inventors: Iwao Hirose, Narashino; Kazumi Yamamoto, Yokohama; Masayuki Sugasawa, Tokyo, all of Japan

[73] Assignee: Ikegami Tsushinki Co., Ltd., Tokyo, Japan

[21] Appl. No.: 591,263

[22] Filed: Oct. 1, 1990

[30] Foreign Application Priority Data

Oct. 30, 1989 [JP] Japan ................................. 1-279744

[51] Int. Cl.⁵ .............................................. H04N 9/64
[52] U.S. Cl. ........................................ 358/27; 358/29
[58] Field of Search ............... 358/27, 29, 43, 21 R

[56] References Cited

U.S. PATENT DOCUMENTS

| | | | |
|---|---|---|---|
| 3,684,825 | 8/1972 | Dischert et al. | 358/27 |
| 4,359,756 | 11/1982 | Schneider et al. | 358/27 |
| 4,384,302 | 5/1983 | Schwarz | 358/40 |
| 4,821,100 | 4/1989 | Yamamoto | 358/27 |

Primary Examiner—David K. Moore
Assistant Examiner—Wendy R. Greening
Attorney, Agent, or Firm—Spencer, Frank & Schneider

[57] ABSTRACT

A color television image processing apparatus having a color fading reduction function which compresses the luminance signal and color difference signals with different compression ratios. Color fading can be prevented even for high luminance images colored by complicated mixtures of red, green and blue signals.

9 Claims, 7 Drawing Sheets

COLOR TELEVISION IMAGE PROCESSING APPARATUS AND METHOD HAVING COLOR FADING REDUCTION FUNCTION

BACKGROUND OF THE INVENTION

1. Field of the Invention

The present invention relates to a color television image processing apparatus and method having a color fading reduction function.

2. Description of the Prior Art

Image pickup apparatuses represented by color television cameras generally keep their contrast ranges at specified values by using white compression circuits. This is because large dynamic ranges between highlight portions and lowlight portions of an image acquired by photoelectric conversion cannot fall within the range of signal levels specified by the NTSC system, PAL system or SECAM system. In addition, color television cameras generally convert the R,G,B signals, each corresponding to one of the three primary colors of light, into a composite video signal by a color encoder. The composite video signal is formed by superimposing the color subcarrier signal on the luminance signal, and is used for transmission between studios or the like.

FIG. 1 shows a conventional color television image processing apparatus.

In FIG. 1, reference numeral 1 designates an image pickup device as an image pickup means. R, G and B signals produced from the image pickup device 1 are fed to amplifiers 71R, 71G and 71B. The amplifiers 71R, 71G and 71B, each having a compression circuit and a gamma correction circuit, amplify and compress the R, G and B signals from the image pickup device 1. The compression circuits in the amplifiers compress the video signals that exceed 100% by a factor of 1/5; and the gamma circuits perform the gamma correction with a gamma value of 0.45 to the outputs of the compression circuits. Compression circuits 72R, 72G and 72B compress the video signals R, G and B from the amplifiers 71R, 71G and 71B, respectively. The compression circuits 72R, 72G and 72B compress the output signals that exceed 95% of the output level of the amplifiers 71R, 71G and 71B by a factor of ½. Maximum value limiting circuits 73R, 73G and 73B clip the video signals R, G and B from the compression circuits 72R, 72G and 72B at the 110% level of the outputs of the compression circuits 72R, 72G and 72B, respectively. A luminance signal matrix circuit 74 generates a luminance signal from the R, G and B video signals, the maximum values of which are limited by the maximum value limiting circuits 73R, 73G and 73B. The mixing ratios of the R, G and B video signals for generating luminance signal Y are defined by the following equation in the NTSC system: $Y = 0.30R + 0.59G + 0.11B$. An I color difference signal matrix circuit 75 generates an I color difference signal from the R, G, and B video signals, the maximum values of which are limited by the maximum value limiting circuits 73R, 73G and 73B. The mixing ratios of the R, G and B video signals for generating the color difference signal I are defined by the following equation in the NTSC system: $I = 0.60R - 0.28G - 0.32B$. A Q color difference signal matrix circuit 76 generates a Q color difference signal from the R, G, and B video signals, the maximum values of which are limited by the maximum value limiting circuits 73R, 73G and 73B. The mixing ratios of the R, G and B video signals for generating the color difference signal Q are defined by the following equation in the NTSC system: $Q = 0.21R - 0.52G + 0.31B$. A modulator 77 modulates the color difference signal I from the I color difference signal matrix circuit 75 and the color difference signal Q from the Q color difference signal matrix circuit 76 onto a subcarrier. A mixing amplifier 78 mixes the luminance signal from the luminance signal matrix circuit 74 and the color difference signal from the modulator 77, thereby generating a color video signal. The blocks 74-78 constitute a color encoder which operates on the output signals of the maximum value limiting circuits 73R, 73G and 73B undergo so that the color video signal outputs are formed.

The relationship between the signals Y, I, Q and R, G, B is expressed by the following matrix equation (1) when, for example, the compression starting point is specified at 95%, the compression ratio is specified at ½, and the maximum value of the input signals to the apparatus is set at 600%.

$$\begin{bmatrix} Y \\ I \\ Q \end{bmatrix} = \begin{bmatrix} R(0\sim0.95) + (\tfrac{1}{2})R(0.96\sim6.0) \\ G(0\sim0.95) + (\tfrac{1}{2})R(0.96\sim6.0) \\ B(0\sim0.95) + (\tfrac{1}{2})R(0.96\sim6.0) \end{bmatrix} \times \quad (1)$$

$$\begin{bmatrix} 0.3 & 0.59 & 0.11 \\ 0.6 & -0.28 & -0.32 \\ 0.21 & -0.52 & 0.31 \end{bmatrix}$$

FIG. 5A shows an example of input light to the image pickup device 1 using a flesh-colored sample. The input light (1), is a mixture of an R signal of 70% level, a G signal of 50% level, and a B signal of 30% level. The input light (2) is 1.3 times the input light (1), the input light (3) is 1.3 times the input light (2), the input light (4) is 1.3 times the input light (3), . . . , and the input light (9) is 1.3 times the input light (8).

The input light shown in FIG. 5A entering the image pickup device 1 makes the mixing amplifier 78 in FIG. 1 produce the color video signal Vout. The color video signal Vout, when decoded into R, G and B signals, exhibit the cherecteristic curves (1)"-(9)" shown in FIG. 5C.

The conventional color television image processing apparatus described above has a problem in that it causes "color fading" in which an image having less color than a real object appears on the television monitor. The color fading occurs markedly in highlight portions such as flesh-colored portions, that is, high luminance colored portions which are complicated mixtures of red, green and blue that include much luminance signal components and less color difference components. This is because the R, G and B video signals produced from the image pickup device 1 lose much of the color difference components corresponding to R, G and B of the object when the video signals are subjected to the white compression of the highlight portions of the object. This phenomenon is clearly seen by comparing FIGS. 5A and 5C.

In contrast with this, the same object illuminated with less light provides a darker image which does not undergo the white compression. As a result, the image appears on the television monitor with exact colors without color fading.

SUMMARY OF THE INVENTION

It is therefore an object of the invention to provide a color television image processing apparatus and method having a color fading reduction function which can reduce the color fading described above.

In a first aspect of the present invention, there is provided a color television image processing apparatus having a color fading reduction function comprising:

a color image pickup device for acquiring an image of a subject, and producing red, green and blue signals;

means for amplifying the red, green and blue signals fed from the color image pickup device;

first compression means for compressing the maximum values of the red, green and blue signals amplified by the means for amplifying with a first compression ratio;

second compression means for compressing the maximum values of the red, green and blue signals amplified by the means for amplifying with a second compression ratio;

means for generating a luminance signal from the red, green and blue signals compressed by the first compression means;

means for generating color difference signals from the red, green and blue signals compressed by the second compression means;

means for limiting the maximum value of the luminance signal generated from the means for generating luminance signal;

means for limiting the maximum values of the color difference signals generated from the means for generating color difference signals; and means for transmitting the luminance signal produced from the means for limiting the maximum value of the luminance signal, and the color difference signals produced from the means for limiting the maximum values of the color difference signals.

In a second aspect of the present invention, there is provided a color television image processing apparatus having a color fading reduction function comprising:

a color image pickup device for acquiring an image of a subject, and producing red, green and blue signals;

means for compressing the red, green and blue signals fed from the color image pickup device;

gamma correction means for performing gamma correction to the red, green and blue signals compressed by the means for compressing the red, green and blue signals;

means for generating a luminance signal from the red, green and blue signals gamma corrected by the gamma correction means;

means for compressing the luminance signal generated by the means for generating the luminance signal;

means for generating color difference signals from the red, green and blue signals gamma corrected by the gamma correction means;

means for limiting the maximum value of the luminance signal produced from the means for compressing luminance signal;

means for limiting the maximum values of the color difference signals generated from the means for generating color difference signals; and means for transmitting the luminance signal produced from the means for limiting the maximum value of the luminance signal, and the color difference signals produced from the means for limiting the maximum values of the color difference signals.

In a third aspect of the present invention, there is provided a color television image processing method having a color fading reduction function comprising the steps of:

acquiring an image of a subject, and producing red, green and blue signals;

amplifying the red, green and blue signals;

compressing the maximum values of the amplified red, green and blue signals with a first compression ratio;

compressing the maximum values of the amplified red, green and blue signals with a second compression ratio;

generating a luminance signal from the red, green and blue signals compressed with the first compression ratio;

generating color difference signals from the red, green and blue signals compressed with the second compression ratio;

limiting the maximum value of the luminance signal;

limiting the maximum values of the color difference signals; and transmitting the luminance signal, the maximum value of which is limited, and the color difference signals, the maximum values of which are limited.

In a fourth aspect of the present invention, there is provided a color television image processing method having a color fading reduction function comprising the steps of:

acquiring an image of a subject, and producing red, green and blue signals;

compressing the red, green and blue signals;

performing gamma correction to the compressed red, green and blue signals;

generating a luminance signal from the gamma corrected red, green and blue signals;

compressing the luminance signal;

limiting the maximum value of the luminance signal;

generating color difference signals from the gamma corrected red, green and blue signals;

limiting the maximum values of the color difference signals; and transmitting the luminance signal, the maximum value of which is limited, and the color difference signals, the maximum values of which are limited.

According to the present invention, the luminance signal and the color difference signals are compressed with different compression ratios. This makes it possible to prevent color fading associated with high luminance images which are complicated mixtures of R, G and B signals.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

[A] FIRST EMBODIMENT

Figure 2:
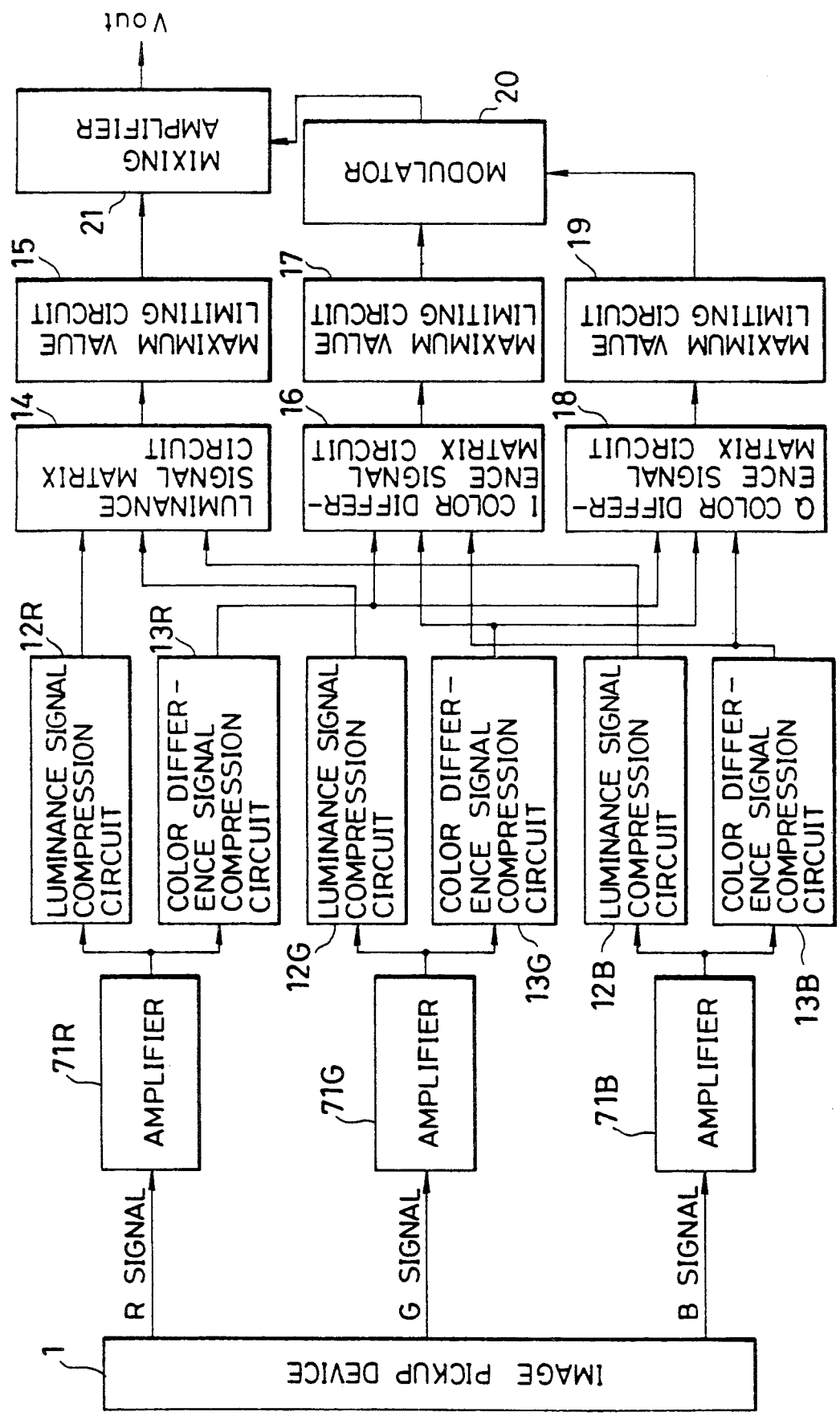
FIG. 2 is a block diagram showing the arrangement of a first embodiment of the present invention.

FIG. 2 shows a first embodiment of the present invention. This embodiment is an example of the NTSC system.

Figure 1:
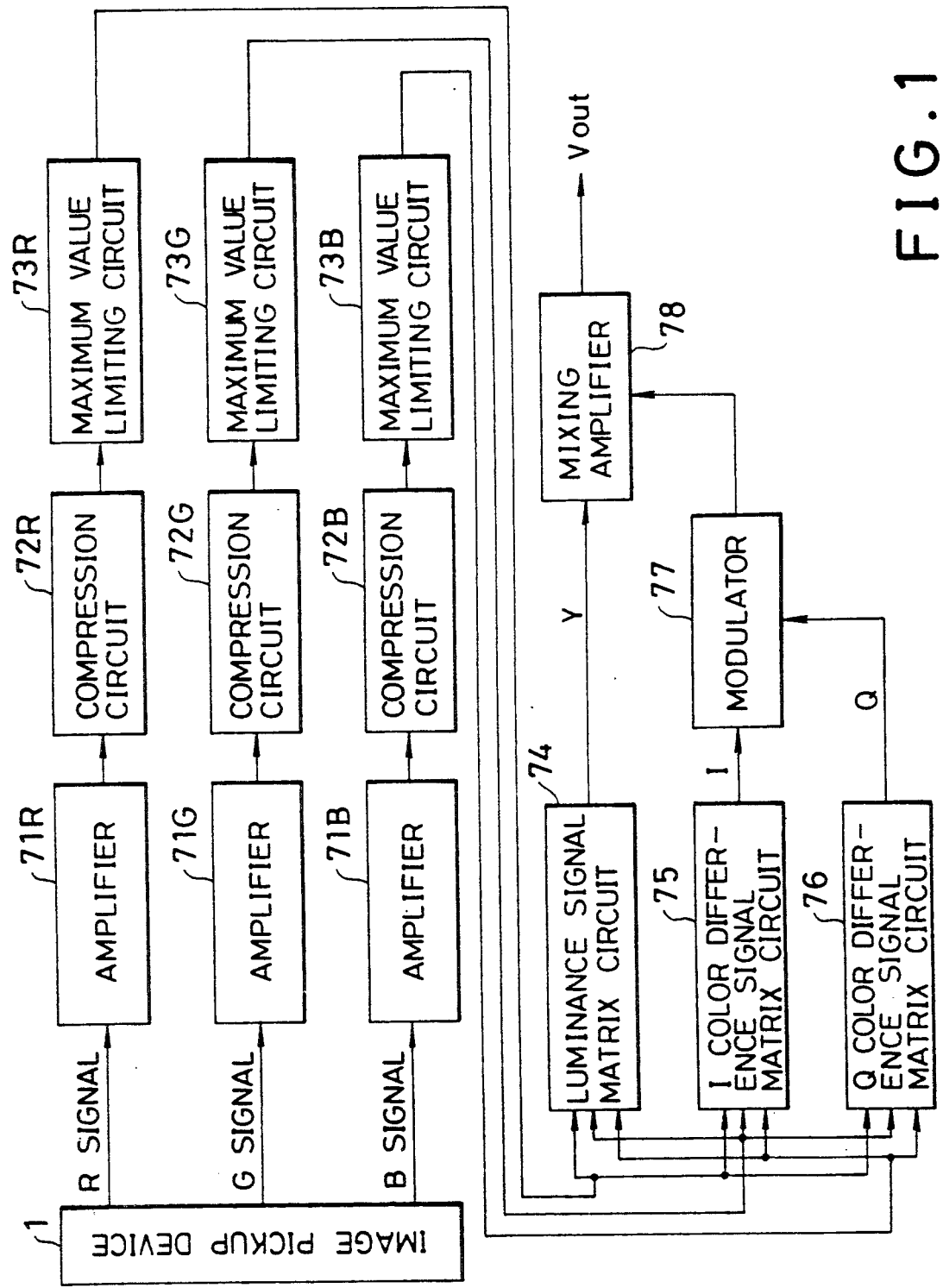
FIG. 1 is a block diagram showing the arrangement of a conventional color television image processing apparatus.
Figure 3:
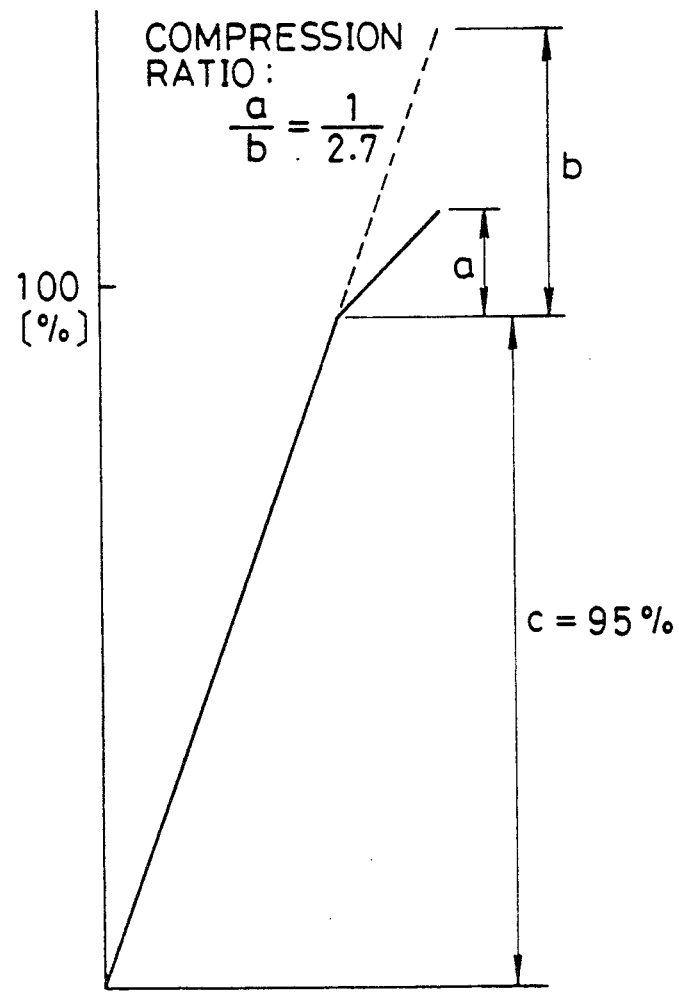
FIG. 3 is a graph illustrating the signal level compression by compression circuits 12R, 12G and 12B of FIG. 2.
Figure 4:
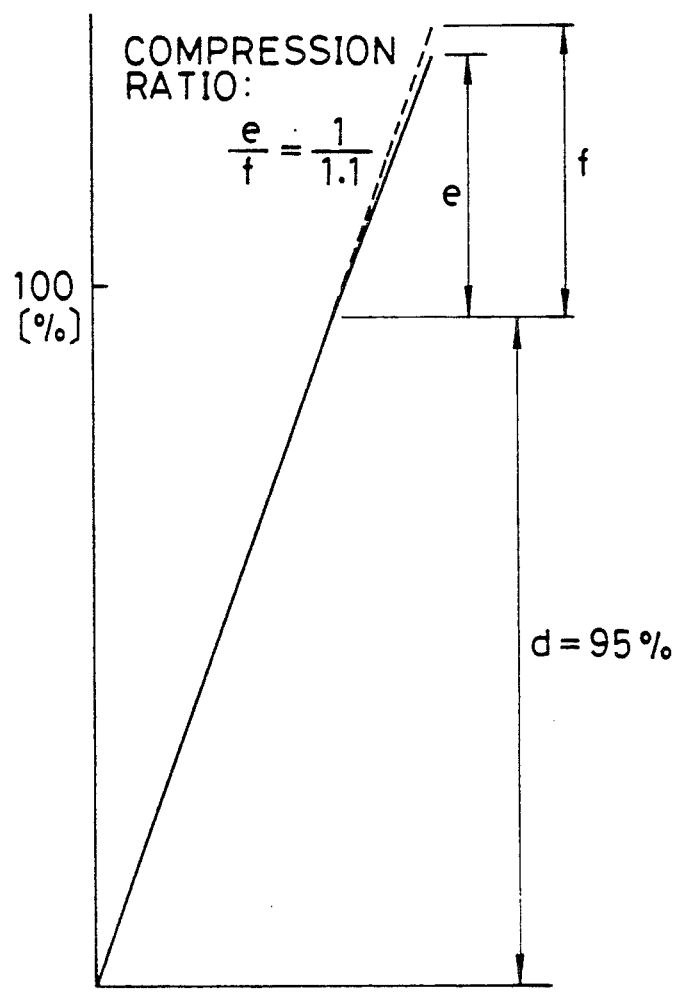
FIG. 4 is a graph illustrating the signal level compression by compression circuits 13R, 13G and 13B of FIG. 2.

In FIG. 2, an image pickup device 1 and amplifiers 71R, 71G and 71B are identical to those of FIG. 1. More specifically, the amplifiers 71R, 71G and 71B, each having a compression circuit and a gamma correction circuit, amplify and compress the R, G and B signals from the image pickup device 1. The compression circuits compress the video signals that exceed 100% by a factor of 1/5; and the gamma circuits perform the gamma correction with a gamma value of 0.45 to the outputs of the compression circuits. Luminance signal compression circuits 12R, 12G and 12B, or a first compression means, are used for compressing the output signals of the amplifiers 71R, 71G and 71B as shown in FIG. 3. The output signals exceeding the level c (=95%) of the output level of the amplifiers 71R, 71G and 71B are compressed by a factor of a/b (=1/2.7). On the other hand, color difference signal compression circuits 13R, 13G and 13B, or a second compression means, are used for compressing the output signals of the amplifiers 71R, 71G and 71B as shown in FIG. 4. The output signals exceeding the level d (=95%) of the output level of the amplifiers 71R, 71G and 71B are compressed by a factor of e/f (=1/1). The ratio 1/1 does not mean compression, and the ratio e/f can be specified at a suitable value (for example, 1/1.1, as shown in FIG. 4).

The outputs of the luminance signal compression circuits 12R, 12G and 12B are applied to a luminance signal matrix circuit 14. The outputs of the color difference signal compression circuits 13R, 13G and 13B are fed to an I color difference signal matrix circuit 16 and a Q color difference signal matrix circuit 18.

The luminance signal matrix circuit 14 generates a luminance signal Y from the R, G and B signals fed from the luminance signal compression circuits 12R, 12G and 12B, and supplies the luminance signal Y to a maximum value limiting circuit 15. The relationship between the luminance signal Y and the R, G and B signals are given by the following equation.

$$Y = 0.30R + 0.59G + 0.11B$$

The maximum value limiting circuit 15 clips the luminance signal Y produced from the luminance signal matrix circuit 14 so that the maximum value of the luminance signal Y is suppressed at a+c (=110%, for example, of the output level of the circuit 14) as shown in FIG. 3. Thus, the output of the luminance signal matrix circuit 14 that exceeds the 110% level is limited thereat.

The I color difference signal matrix circuit 16 generates the I color difference signal or the first color difference signal from the R, G and B signals fed from the color difference signal compression circuits 13R, 13G and 13B. The relationship between the color difference signal I and the R, G and B signals are given by the following equation.

$$I = 0.60R - 0.28G - 0.32B$$

As easily seen from the equation, the color difference signal I takes a value of +0.6 when R=1, and G=B=0 of the video level, and a value of −0.6 when R=0, and G=B=1. Accordingly, in the NTSC system, $-0.6 \leq I \leq +0.6$. A maximum value limiting circuit 17 clips the color difference signal I produced from the color difference signal matrix circuit 16 so that the maximum value of the color difference signal I is suppressed at the peak amplitude ±0.6. Thus, the output of the color difference signal matrix circuit 16 that exceeds the ±0.6 is limited at ±0.6.

The Q color difference signal matrix circuit 18 generates the Q color difference signal or the second color difference signal from the R, G and B signals fed from the color difference signal compression circuits 13R, 13G and 13B. The relationship between the color difference signal Q and the R, G and B signals are given by the following equation.

$$Q = 0.21R - 0.52G + 0.31B$$

As easily seen from the equation, the color difference signal Q takes a value of +0.52 when R=B=1, and G=0, and a value of −0.52 when R=B=0, and G=1. Accordingly, in the NTSC system, $-0.52 \leq Q \leq +0.52$. A maximum value limiting circuit 19 clips the color difference signal Q produced from the color difference signal matrix circuit 18 so that the maximum value of the color difference signal Q is suppressed at the peak amplitude ±0.52. Thus, the output of the color difference signal matrix circuit 18 that exceeds the ±0.52 is limited at ±0.52.

A modulator 20 modulates the color difference signals from the maximum value limiting circuits 17 and 19 onto the color subcarrier. A mixing amplifier 21 generates a color video signal by mixing the luminance signal from the maximum value limiting circuit 15 and the color difference signal from the modulator 20.

Incidentally, the luminance signal matrix circuit 14, I color difference signal matrix circuit 16 and Q color difference signal matrix circuit 18 constitute a luminance and a color difference signal generating means. The maximum value limiting circuits 15, 17 and 19 constitute limiting means, and the modulator 20 and mixing amplifier 21 constitute a transmission means.

The operation of the first embodiment is now to be described.

The R, G and B signals produced from the image pickup device 1 undergo amplification, compression and gamma correction by the amplifiers 71R, 71G and 71B. The compression is performed on the signals exceeding the compression reference level of 100% according to equation (2).

$$(R(0\sim 1.00)+(1/5)R(1.01\sim 6.00))^{1/\gamma}$$

$$(G(0\sim 1.00)+(1/5)G(1.01\sim 6.00))^{1/\gamma} \quad (2)$$

$$(B(0\sim 1.00)+(1/5)B(1.01\sim 6.00))^{1/\gamma}$$

where the value 1/5 indicates the compression ratio that can be specified at a desired value less than 1, and $\gamma=2.2$. As a result, the R, G and B signals, the maximum value of which are 600%, namely, 6R, 6G and 6B are transformed to 1.36R, 1.36G and 1.36B, respectively.

The R, G and B signals of 136% are compressed by the luminance signal compression circuits 12R, 12G and 12B so that the maximum values of the outputs are suppressed at the 110% level. More specifically, the R, G and B signals exceeding 0.95 are compressed according to the equation (3), so that the maximum values thereof become 1.1R, 1.1G and 1.1B.

$$R(0\sim 0.95)+(1/2.7)R(0.96\sim 1.36)$$

$$G(0\sim 0.95)+(1/2.7)G(0.96\sim 1.36) \quad (3)$$

$$B(0\sim 0.95)+(1/2.7)B(0.96\sim 1.36)$$

where the value 1/2.7 indicates the compression ratio a/b of FIG. 3, which can be specified to a desired value less than 1.

After that, the luminance signal Y is generated from the R, G and B signals of the 110% level by the luminance signal matrix circuit 14. The maximum value of the luminance signal Y is limited to 110% by the maximum value limiting circuits 15 so that it does not interfere in the color transmission lines.

On the other hand, the R, G and B signals of 136% are compressed by the color difference signal compression circuits 13R, 13G and 13B so that the maximum values of the outputs are suppressed at the 132% level. More specifically, the R, G and B signals exceeding 0.95 are compressed according to equation (4), so that the maximum values thereof become 1.32R, 1.32G and 1.32B.

$$R(0\sim 0.95)+(1/1.1)R(0.96\sim 1.36)$$

$$G(0\sim 0.95)+(1/1.1)G(0.96\sim 1.36) \quad (4)$$

$$B(0\sim 0.95)+(1/1.1)B(0.96\sim 1.36)$$

where the value 1/1.1 indicates the compression ratio e/f of FIG. 4, which can be specified to a desired value satisfying the relationship of $e/f > a/b$.

After that, the color difference signal I is generated from the R, G and B signals of the 132% level by the I color difference signal matrix circuit 16, and the color difference signal Q is generated from the R, G and B signals of the 132% level by the Q color difference signal matrix circuit 18.

The color difference signals I and Q thus generated can be expressed by equation (5).

$$I=0.6(1.32R)-0.28(1.32G)-0.32(1.32B)$$

$$Q=0.21(1.32R)-0.52(1.32G)+0.31(1.32B) \quad (5)$$

Thus, the coefficients of R, G and B are as shown in Table 1.

TABLE 1

|   | R | G | B |
|---|---|---|---|
| I | 0.792 | −0.3696 | −0.4224 |
| O | 0.2772 | −0.6864 | 0.4092 |

As seen from Table 1, the coefficient of the I color difference signal for the R signal is 0.792, which exceeds ±0.6 specified by the NTSC system. Likewise, the coefficient of the Q color difference signal for the G signal is −0.6864, which exceeds ±0.52 specified by the NTSC system.

The maximum value of the color difference signal I from the I color difference signal matrix 16 is limited by the maximum vlaue limiting circuit 17, and the maximum value of the color difference signal Q from the Q color difference signal matrix circuit 18 is limited by the maximum value limiting circuit 19. The color difference signals I and Q, the maximum values of which are thus limited are modulated onto the subcarrier by the modulator 20, and then mixed by the mixing amplifier 21 with the luminance signal, the maximum value of which is limited, thereby generating the color video signal.

Figure 5:
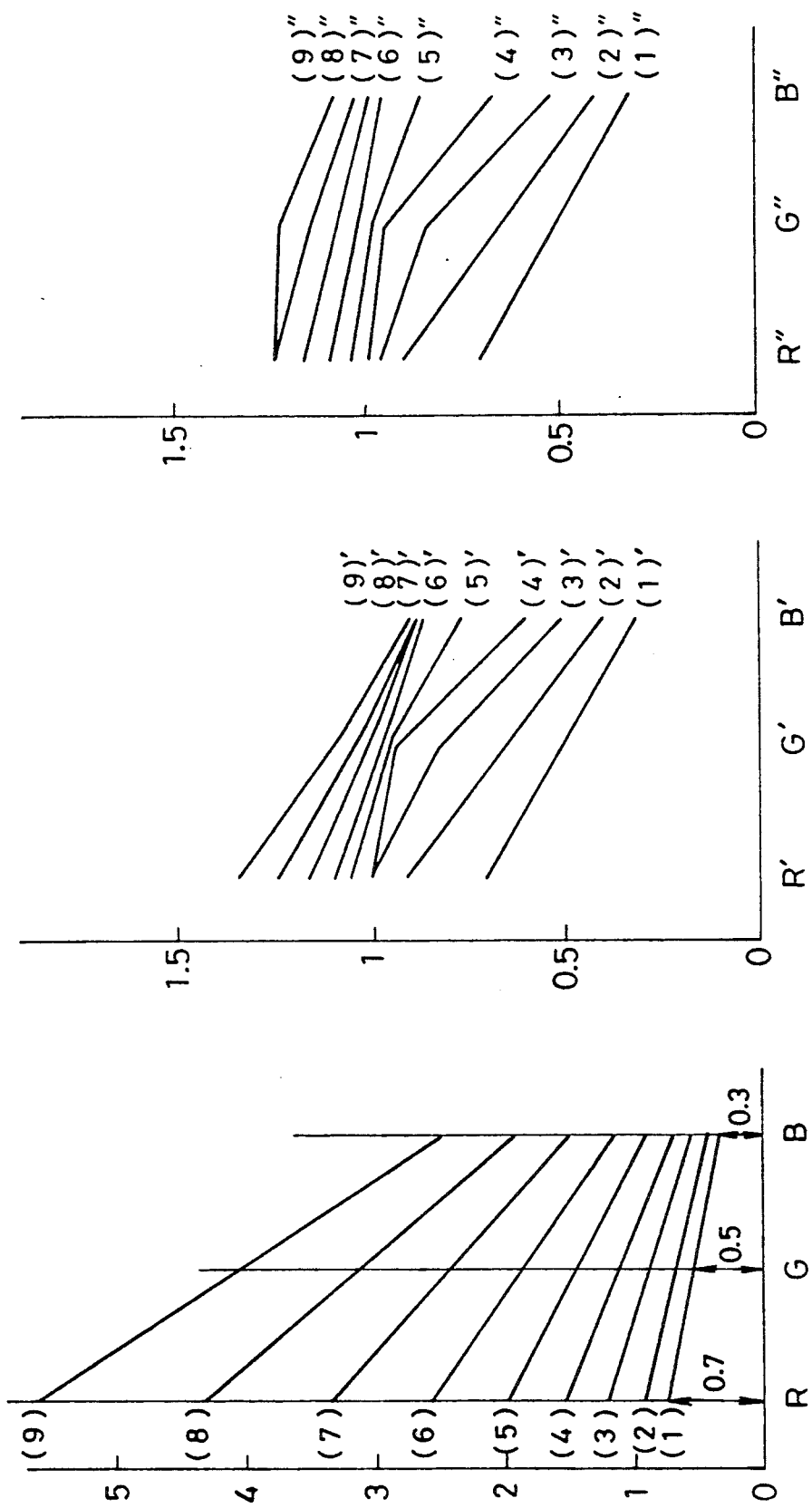
FIG. 5A is a graph illustrating levels of R, G and B components of light entering the image pickup device in FIG. 2.
FIG. 5B is a graph illustrating levels of R, G and B components obtained by decoding the color video signal output of the first embodiment shown in FIG. 2.
FIG. 5C is a graph illustrating levels of R, G and B components obtained by decoding the color video signal output of the conventional apparatus shown in FIG. 1.

The color video signal, if it is decoded back into R, G and B signals, yields the three signal components R, G and B shown in FIG. 5B. In contrast with this, FIG. 5A illustrates the levels of R, G and B components of light entering the image pickup device 1 with its intensity varied as described before, and FIG. 5C illustrates the levels of R, G and B components obtained by decoding the color video signal output of the conventional apparatus shown in FIG. 1. As seen by comparing FIG. 5B with FIG. 5C, the inclinations of the characteristic lines are different at higher levels. The inclination of the lines of embodiment shown in FIG. 5B is closer to those of the entering light shown in FIG. 5A than is those of the conventional apparatus shown in FIG. 5C. This means that the color difference can be better reproduced in the embodiment of the invention than in the conventional apparatus.

[B] SECOND EMBODIMENT

Figure 6:
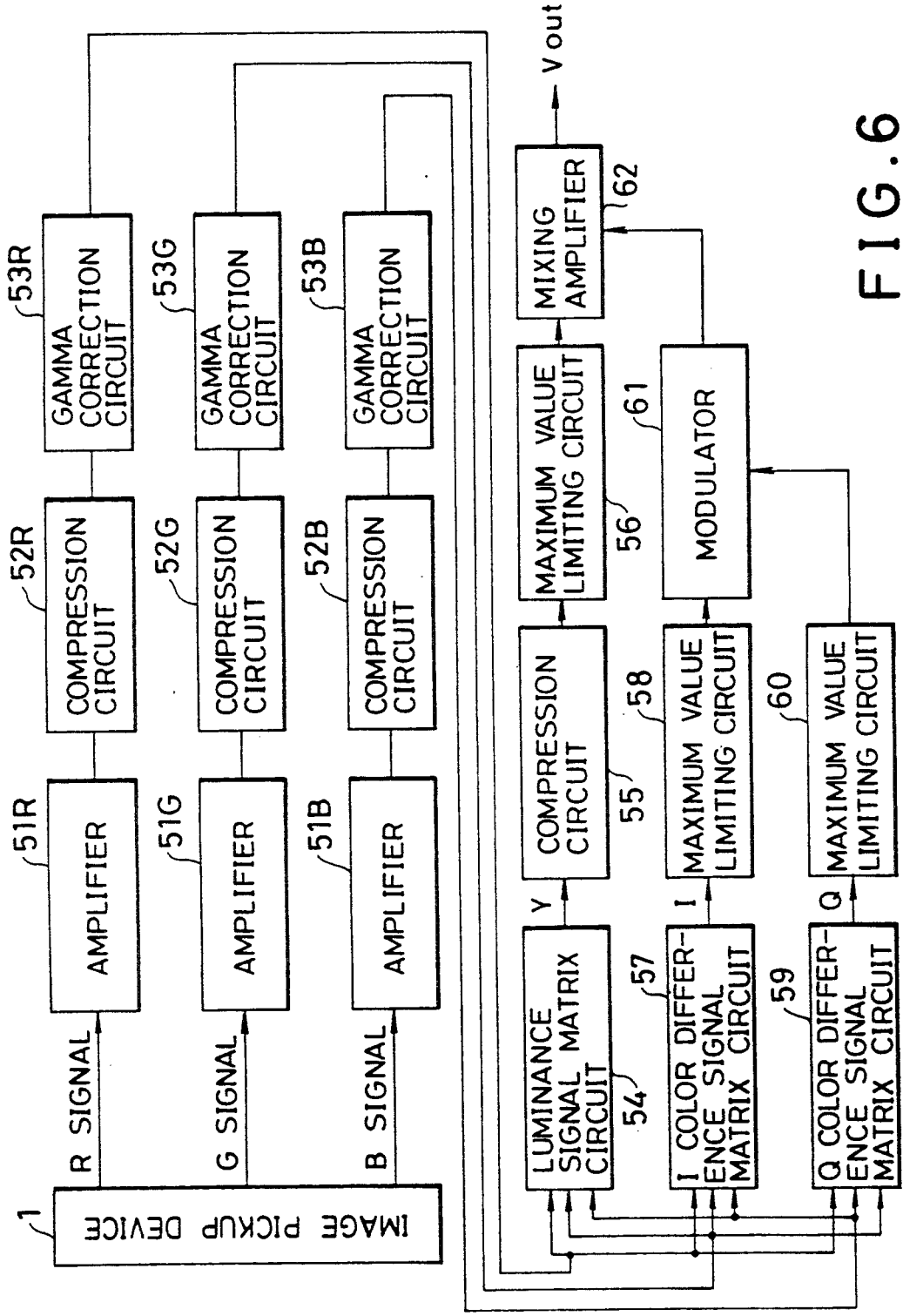
FIG. 6 is a block diagram showing the arrangement of a second embodiment of the present invention.

FIG. 6 shows a second embodiment of the present invention.

In FIG. 6, an image pickup device 1 is identical to that of FIG. 1. Amplifiers 51R, 51G and 51B amplify the R, G and B signals fed from the image pickup device 1. Compression circuits 52R, 52G and 52B, or the third compression means, compress R, G and B signals which are fed from the amplifiers 51R, 51G and 51B and exceed 100% of the video signal level by a factor of 1/5. Gamma correction circuits 53R, 53G and 53B perform the gamma correction with a gamma value of 0.45 to the outputs of the compression circuits 52R, 52G and 52B.

The outputs of the gamma correction circuits 53R, 53G and 53B are applied to a luminance signal matrix circuit 54, an I color difference signal matrix circuit 57, and a Q color difference signal matrix circuit 59.

The luminance signal matrix circuit 54, or a luminance signal generating means, generates a luminance signal Y from the R, G and B signals fed from the gamma correction circuits 53R, 53G and 53B, and supplies the luminance signal Y to a compression circuit 55. The relationship between the luminance signal Y and the R, G and B signals are given by the following equation in the NTSC system.

$$Y = 0.30R + 0.59G + 0.11B$$

The compression circuit 55, or a luminance signal compression means, compresses the output signal of the luminance signal matrix circuit 54 that exceeds the 95% level by a factor of 1/2.7. The output of the compression circuit 55 is applied to a maximum value limiting circuit 56. The maximum value limiting circuit 56 clips the luminance signal Y produced from the compression circuit 55 so that the maximum value of the luminance signal Y is suppressed at a+c (=110%, for example) as shown in FIG. 3. Thus, the output of the compression circuit 55 that exceeds the 110% level is limited at 110%.

The I color difference signal matrix circuit 57 generates the I color difference signal or the first color difference signal from the R, G and B signals fed from the gamma correction circuits 53R, 53G and 53B. The relationship between the color difference signal I and the R, G and B signals are given by the following equation in the NTSC system.

$$I = 0.60R - 0.28G - 0.32B$$

As easily seen from the equation, the color difference signal I takes a value of +0.6 when R=1, and G=B=0 of the video level, and a value of −0.6 when R=0, and G=B=1. Accordingly, in the NTSC system, $-0.6 \leq I \leq +0.6$. A maximum value limiting circuit 58 clips the color difference signal I produced from the I color difference signal matrix circuit 57 so that the maximum value of the color difference signal I is suppressed at the peak amplitude ±0.6. Thus, the output of the I color difference signal matrix circuit 57 that exceeds the ±0.6 is limited at ±0.6.

The Q color difference signal matrix circuit 59 generates the Q color difference signal or the second color difference signal from the R, G and B signals fed from the gamma correction circuits 53R, 53G and 53B. The relationship between the color difference signal Q and the R, G and B signals are given by the following equation in the NTSC system.

$$Q = 0.21R - 0.52G + 0.31B$$

As easily seen from the equation, the color difference signal Q takes a value of +0.52 when R=B=1, and G=0, and a value of −0.52 when R=B=0, and G=1. Accordingly, in the NTSC system, $-0.52 \leq Q \leq +0.52$. A maximum value limiting circuit 60 clips the color difference signal Q produced from the Q color difference signal matrix circuit 59 so that the maximum value of the color difference signal Q is suppressed at the peak amplitude of ±0.52. Thus, the output of the Q color difference signal matrix circuit 59 that exceeds the ±0.52 is limited at ±0.52.

A modulator 61 modulates the color difference signals from the maximum value limiting circuits 58 and 60 onto the color subcarrier. A mixing amplifier 62 generates a color video signal by mixing the luminance signal Y from the maximum value limiting circuit 56 and the color difference signal from the modulator 61.

Incidentally, the I color difference signal matrix circuit 57 and Q color difference signal matrix circuit 59 constitute a color difference signal generating means. The maximum value limiting circuits 56, 58 and 60 constitute limiting means, and the modulator 61 and mixing amplifier 62 constitute a transmission means.

The operation of the second embodiment is now to be described.

The R, G and B signals produced from the image pickup device 1 are amplified by the amplifiers 51R, 51G and 51B, and compressed by the compression circuits 52R, 52G and 52B: the compression is performed on signals above the compression reference level of 100% according to the equation (6).

$$R(0 \sim 1.00) + (1/5)R(1.01 \sim 6.00)$$
$$G(0 \sim 1.00) + (1/5)G(1.01 \sim 6.00) \quad (6)$$
$$B(0 \sim 1.00) + (1/5)B(1.01 \sim 6.00)$$

where the value 1/5 indicates the compression ratio that can be specified at a desired value less than 1. As a result, the R, G and B signals, the maximum value of which are 600%, namely, 6R, 6G and 6B are transformed to 2.00R, 2.00G and 2.00B, respectively.

The R, G and B signals of 200% are compressed by the gamma correction circuits 53R, 53G and 53B according to equation (7).

$$E_{in}^{1/\gamma} = E_{out} \quad (7)$$

where
Ein: input
Eout: output
γ: gamma characteristic constant of a color CRT (=2.2)

Accordingly, the following equations are obtained.

$$(2R)^{1/\gamma} = 1.36R$$
$$(2G)^{1/\gamma} = 1.36G \quad (8)$$
$$(2B)^{1/\gamma} = 1.36B$$

Thus, R, G and B signals of 136% can be obtained.

After that, the luminance signal Y is generated from the R, G and B signals of the 136% level by the luminance signal matrix circuit 54. The luminance signal Y is expressed as follows.

$$Y = 0.3(1.36R) + 0.59(1.36G) + 0.11(1.36B) \quad (9)$$

The luminance signal Y thus generated is compressed by the compression circuit 55 so that its maximum value becomes 110% of the rated value of the luminance signal, and subsequently, its maximum value is limited to 110% by the maximum value limiting circuit 56 so that the luminance signal Y does not interfere in the color transmission lines.

On the other hand, the color difference signal I is generated from the R, G and B signals of the 136% level by the I color difference signal matrix circuit 57, and the color difference signal Q is generated from the R, G and B signals of the 136% level by the Q color difference signal matrix circuit 59.

The color difference signals I and Q thus generated can be expressed by equation (10).

$$I = 0.6(1.36R) - 0.28(1.36G) - 0.32(1.36B)$$

$$Q = 0.21(1.36R) - 0.52(1.36G) + 0.31(1.36B) \quad (10)$$

Thus, the coefficients of R, G and B are as shown in Table 2.

TABLE 2

|   | R | G | B |
|---|---|---|---|
| I | 0.816 | −0.381 | −0.435 |
| O | 0.286 | −0.707 | 0.422 |

As seen from Table 2, the coefficient of the I color difference signal for the R signal is 0.816, which exceeds ±0.6 specified by the NTSC system. Likewise, the coefficient of the Q color difference signal for the G signal is −0.707, which exceeds ±0.52 specified by the NTSC system.

The color difference signal I from the I color difference signal matrix 57 is limited its maximum value by the maximum value limiting circuit 58, and the color difference signal Q from the Q color difference signal matrix circuit 59 is also limited to its maximum value by the maximum value limiting circuit 60. The color difference signals I and Q, the maximum values of which are thus limited, are modulated onto the subcarrier by the modulator 61, and then mixed by the mixing amplifier 62 with the luminance signal, the maximum value of which is limited, thereby generating the color video signal.

Figures 7A, 7B, 7C:
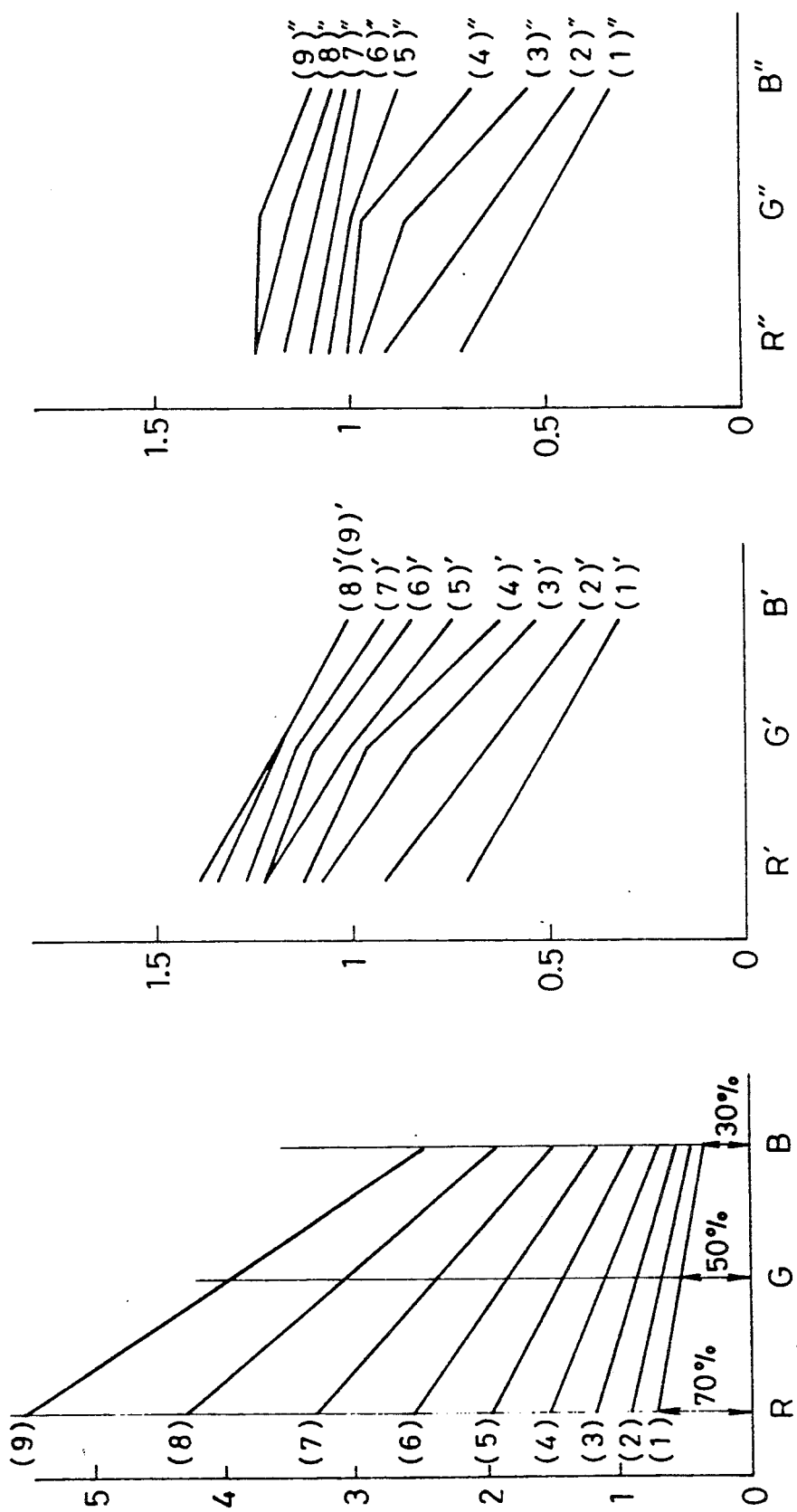
FIG. 7A is a graph illustrating levels of R, G and B components of light entering the image pickup device in FIG. 6.
FIG. 7B is a graph illustrating levels of R, G and B components obtained by decoding the color video signal output of the second embodiment shown in FIG. 6.
FIG. 7C is a graph illustrating levels of R, G and B components obtained by decoding the color video signal output of the conventional apparatus shown in FIG. 1.

The color video signal, if it is decoded back into R, G and B signals, yields the three signal components R', G' and B' shown in FIG. 7B. In contrast with this, FIG. 7A illustrates the levels of the R, G and B components of light entering the image pickup device 1 with its intensity varied as in FIG. 5A, and FIG. 7C illustrates the levels of the R, G and B components (signal components R'', G'' and B'') obtained by decoding the color video signal output of the conventional apparatus shown in FIG. 1. As seen by comparing FIG. 7B with FIG. 7C, the inclinations of the characteristic lines are different at higher levels. The inclination of the embodiment shown in FIG. 7B is closer to those of the entering light shown in FIG. 7A than those of the conventional apparatus shown in FIG. 7C. This means that the color difference can be better reproduced in the embodiment of this invention than in the conventional apparatus.

The present invention, as described above, compresses the luminance signal and color difference signal with different compression ratios. As a result, the color fading can be prevented even for the high luminance images colored by complicated mixtures of red, green and blue.

Although specific embodiments of a color television image processing apparatus and method having a color fading reduction function constructed in accordance with the present invention have been disclosed, it is not intended that the invention be restricted to either the specific configurations or the uses disclosed herein. Modifications may be made in a manner obvious to those skilled in the art. For example, although the above embodiments use analog signals, digital signals can also be used.

Accordingly, it is intended that the invention be limited only by the scope of the appended claims.

What is claimed is:

1. A color television image processing apparatus having a color fading reduction function comprising:
    a color image pickup device for acquiring an image of a subject, and producing red, green and blue signals;
    amplifying means for amplifying the red, green and blue signals fed from the color image pickup device;
    compression means for compressing the maximum values of the red, green and blue signals amplified by said amplifying means;
    matrix means for generating a luminance signal and color difference signals from the red, green and blue signals compressed by said compression means;
    first limiting means for limiting the maximum value of the luminance signal generated by said matrix means;
    second limiting means for limiting the maximum values of the color difference signals generated by said matrix means; and
    transmission means for transmitting the luminance signal produced by said first limiting means and for transmitting the color difference signals produced by said second limiting means.

2. A color television image processing apparatus as claimed in claim 1 wherein
    said compression means comprises
    first compression means for compressing the maximum values of the red, green and blue signals amplified by said amplifying means with a first compression ratio and second compression means for compressing the maximum values of the red, green and blue signals amplified by said amplifying means with a second compression ratio; and wherein
    said matrix means comprises means for generating a luminance signal from the red, green and blue signals compressed by said first compression means, and means for generating color difference signals from the red, green and blue signals compressed by said second compression means.

3. A color television image processing apparatus as claimed in claim 2, wherein the first compression ratio is smaller than the second compression ratio.

4. A color television image processing apparatus having a color fading reduction function comprising:
    a color image pickup device for acquiring an image of a subject, and produces red, green and blue signals;
    means for compressing the red, green and blue signals fed from the color image pickup device;
    gamma correction means for performing gamma correction to the red, green and blue signals compressed by the means for compressing the red, green and blue signals;
    means for generating a luminance signal from the red, green and blue signals gamma corrected by the gamma correction means;
    means for compressing the luminance signal generated by the means for generating the luminance signal;
    means for limiting the maximum value of the luminance signal produced from the means for compressing the luminance signal;

means for generating color difference signals from the red, green and blue signals gamma corrected by the gamma correction means;

means for limiting the maximum values of the color difference signals generated from the means for generating color difference signals; and means for transmitting the luminance signal produced from the means for limiting the maximum value of the luminance signal, and the color difference signals produced from the means for limiting the maximum values of the color difference signals.

5. A method for processing a color television image having a color fading reduction function comprising the steps of:

acquiring an image of a subject, and producing red, green and blue signals;

compressing the red, green and blue signals;

performing gamma correction to the compressed red, green and blue signals;

generating a luminance signal from the gamma corrected red, green and blue signals;

compressing the luminance signal;

limiting the maximum value of the luminance signal;

generating color difference signals from the gamma corrected red, green and blue signals;

limiting the maximum values of the color difference signals; and transmitting the luminance signal the maximum value of which is limited, and the color difference signals the maximum values of which are limited.

6. A method for processing a color television image having a color fading reduction function comprising the steps of:

acquiring an image of a subject, and producing red, green and blue signals;

amplifying the red, green and blue signals;

compressing the maximum values of the amplified red, green and blue signals;

generating a luminance signal and color difference signals from the compressed red, green and blue signals;

limiting the maximum value of the luminance signal;

limiting the maximum values of the color difference signals; and transmitting the luminance signal and the color difference signals, the maximum values of which have been limited.

7. A method for processing a color television image as claimed in claim 6 wherein the step of amplifying the red, green and blue signals includes the further steps of compressing said red, green and blue signals, and gamma-correcting said signals after compression.

8. A method for processing a color television image as claimed in claim 6 wherein said compression step comprises the steps of compressing the maximum values of the amplified red, green and blue signals with a first compression ratio, and compressing the maximum values of the amplified red, green and blue signals with a second compression ratio; and wherein said generating step comprises the steps of generating a luminance signal from the red, green and blue signals compressed with the first compression ratio, and generating color difference signals from the red, green and blue signals compressed with the second compression ratio.

9. A method of processing a color television image as claimed in claim 8, wherein the first compression ratio is smaller than the second compression ratio.

* * * * *